March 19, 1968  F. J. DEL GIUDICE  3,374,032
AIRCRAFT SEAT

Filed Feb. 13, 1967  2 Sheets-Sheet 1

INVENTOR.
FRANK J. DEL GIUDICE
BY
Christie, Parker & Hale
ATTORNEYS.

March 19, 1968  F. J. DEL GIUDICE  3,374,032
AIRCRAFT SEAT

Filed Feb. 13, 1967

INVENTOR.
FRANK J. DEL GIUDICE
BY
Christie, Parker & Hale
ATTORNEYS.

United States Patent Office 3,374,032
Patented Mar. 19, 1968

3,374,032
AIRCRAFT SEAT
Frank J. Del Giudice, Seattle, Wash., assignor to Hardman Tool and Engineering Company, Los Angeles, Calif., a corporation of California
Filed Feb. 13, 1967, Ser. No. 615,462
12 Claims. (Cl. 297—394)

ABSTRACT OF THE DISCLOSURE

A multiple seat assembly for aircraft having three passenger seats mounted on a frame. Each seat has a headrest above its back in position to cushion a passenger's head. The middle headrest may be removed and positioned above its seat's bottom between the end seats to form an armrest and seat divider. When a three-seat arrangement is desired, armrests between adjacent seats are lowered from the seat's back.

Background of the invention

Airline tourist accommodations generally employ seating assemblies having three-abreast passenger seats. To afford maximum revenue each seat is generally as confined as practical. However, the loading conditions aboard airlines vary from relatively few passengers aboard a given flight to full capacity. A low loading condition, however, does not free passengers from their relatively cramped seats because present aircraft seating arrangements do not provide for the conversion of a three-seat assembly into a two-seat unit with its concomitant passenger comfort.

Summary of the invention

The subject invention provides an aircraft seating assembly which is readily converted from a full capacity seating unit to a unit having a lower capacity thereby increasing passenger comfort when all seats aboard the aircraft are not taken.

In one form, the invention contemplates a seating assembly having at least three side-by-side passenger seats mounted on a common frame. A headrest is disposed above the back of each seat. The headrest above the middle seat is removable and can be mounted on the frame in position between the end seats to form a seat divider and armrest.

In one preferred form, each passenger seat has a removable headrest for the conversion of the seating assembly into a lounge. Each of the headrests has a pair of spaced-apart mounting members extending from its bottom side for mounting on the assembly's frame. The frame is preferably adapted with housings to receive the mounting members. These housings are located in the frame in position to mount the headrests as headrests and, in addition, to receive the headrests as a seat divider and armrest over seats which have adjacent seats. In the case of a seating assembly having three passenger seats, the seat divider housings are located above and to either side of the middle seat's bottom. The seating assembly preferably includes foldable armrests which are mounted on the frame between each adjoining seat and are capable of folding into the back of the assembly when the seat divider is used. Each of the armrests has a contoured bottom which when folded back into the seat assembly conforms to the line of the passenger seat's back and forms a part of the back. In use, the headrest, when converted to an armrest and seat divider, replaces the foldable armrest and increases passenger seating room. Increased seating room is the result of the fact that the headrests are preferably narrower than the distance between the foldable armrests. Preferred practice also dictates the use of a hard material such as extruded plastic for the backing of the headrest. The headrest when used as a seat divider and armrest presents the hard surface as a table for the convenience of the passengers. With the hard-backed headrest, a tray formed by a recess in the back may be provided. To anchor the headrest when used as a seat divider it is preferred to have at least one detent within each of the housings in which the headrest mounting members are received that acts on the members to secure them in place.

The aircraft seat assembly of this invention provides for the conversion from full capacity seating to low capacity seating with increased passenger comfort. Conversion is possible through the use of a headrest, which is not needed as such in unoccupied seats, as a seat divider and armrest. The double function of the headrest eliminates the need for excess components which would otherwise be necessary to convert a seating assembly from full to partial loading or the converse. The foldable armrest in cooperation with the removable headrests allows conversion in an easy and expeditious manner. Passenger appeal is further enhanced by providing each passenger seat with a removable headrest thereby converting a normal passenger seat into a lounge.

These and other features, aspects and advantages of the invention will become more apparent from the following description, appended claims and drawings.

Figure 1:
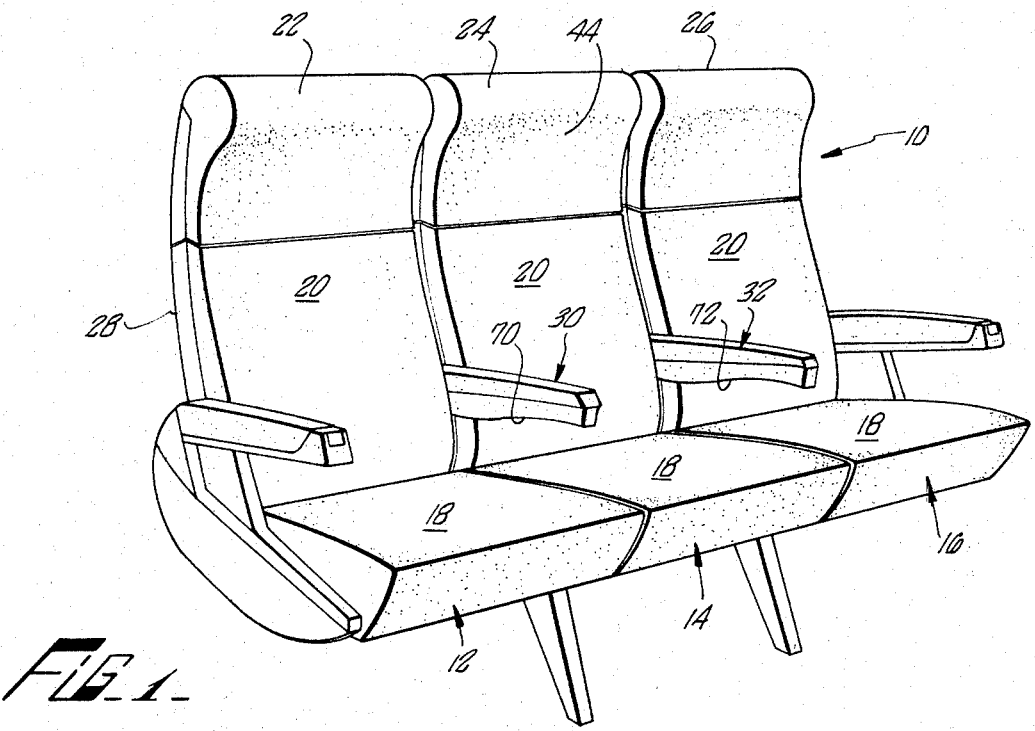
FIGURE 1 is a perspective view of a preferred embodiment of the present invention showing a headrest in position above each of three individual passenger seats and foldable armrests distended horizontally.

In general, seating assembly 10 comprises three passenger seats 12, 14 and 16. Each seat includes a bottom or cushion 18 and a back 20. Removable headrests 22, 24 and 26 are mounted on frame 28 above backs 20 of seats 12, 14 and 16, respectively. Foldable armrest 30 is disposed between backs 20 of seats 12 and 14. Armrest 30 is pivotally mounted on frame 28. Similarly, armrest 32 is pivotally mounted to frame 28 between the backs of seats 14 and 16.

Figure 2:
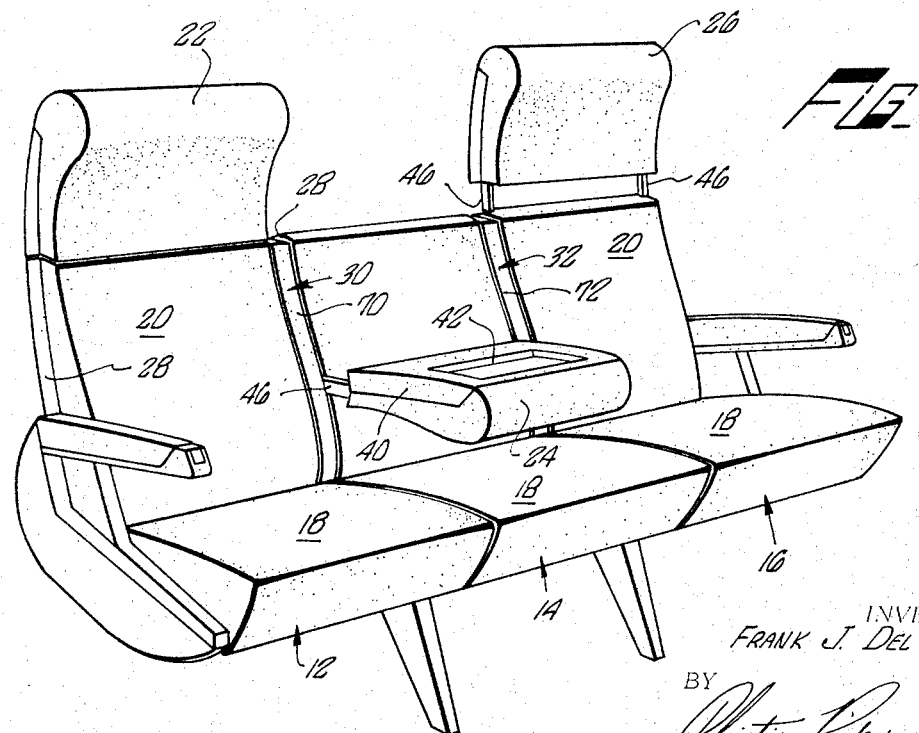
FIGURE 2 shows the embodiment of FIGURE 1 converted into a two-place passenger seating assembly by the removal of the center headrest and its conversion into an armrest and seat divider.

FIGURE 2 shows seat 10 converted from a three-place seating assembly to a two-place assembly. Conversion is accomplished by the removal of headrest 24 and its placement above bottom 18 of seat 14 and the folding of armrests 30 and 32 into the back of seating assembly 10 between the backs of seats 12 and 14 and seats 14 and 16. The anchoring of headrest 24 in frame 28 will become apparent as the description proceeds. Headrest 24 has a hard back 40 preferably of extruded plastic. Recess 42 is formed in back 40 to provide a tray for passenger use. Contoured cushion 44 forms the front of headrest 24 and provides a soft support for a passenger's head. Mounting members or arms 46 are attached to the headrest and form a part of the means for anchoring the headrest in position to act as a headrest or, alternatively, as a seat divider and armrest. Each headrest is preferably tapered or contoured to present a narrower top than bottom in headrest position and narrower front than back in seat divider position.

Figure 3:
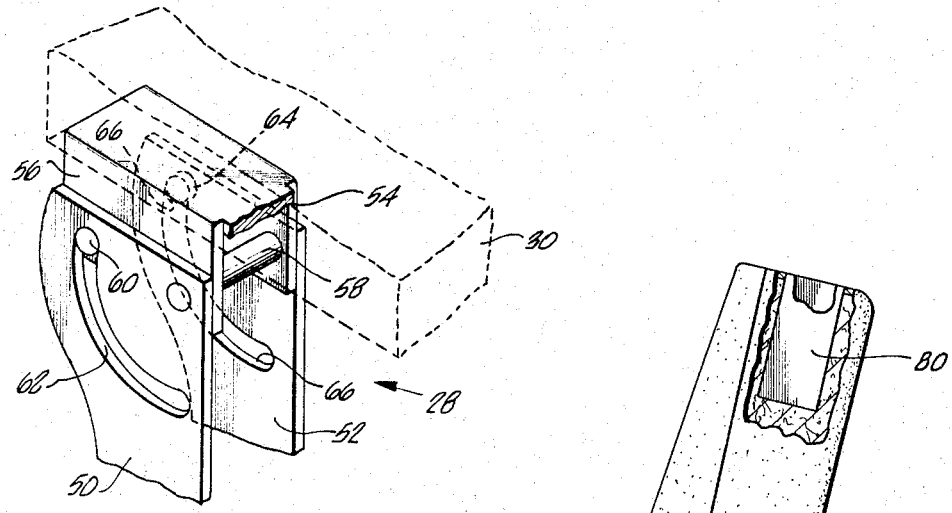
FIGURE 3 is a perspective, fragmentary view showing a preferred mounting apparatus for each of the foldable armrests.

FIGURE 3 depicts the manner in which armrests 30 and 32 are mounted to frame 28. Frame 28 includes a pair of vertical support members 50 and 52 for each of the foldable armrests. Each armrest terminates at its bottom rear edge in a pair of ears which are illustrated in FIGURE 3 by reference numerals 54 and 56. These ears are pivotally mounted on pin 58 which is secured at its ends in supports 50 and 52. Stop pin 60 is secured to ear 56 and is received in circular slot 62 of support 50. Stop pin 64 in ear 54 extends into circular slot 66 of support 52. Pins 60 and 64 are slidable in slots 62 and 66 and constrained at the slot's ends for the proper positioning of the armrest in either its vertical or horizontal attitude.

As is shown clearly in FIGURES 1 and 2, armrests 30 and 32 have contoured bottoms 70 and 72 which conform to the contour of backs 20 to present a flush, continuous back support for passengers when arms 30 and 32 are folded into the back of the seat. The contoured bottoms also extend the lateral seating room for seats 12 and 16 because headrest 14 is sized to utilize the increase in available space provided by the folding up of armrests 30 and 32.

Figure 4:
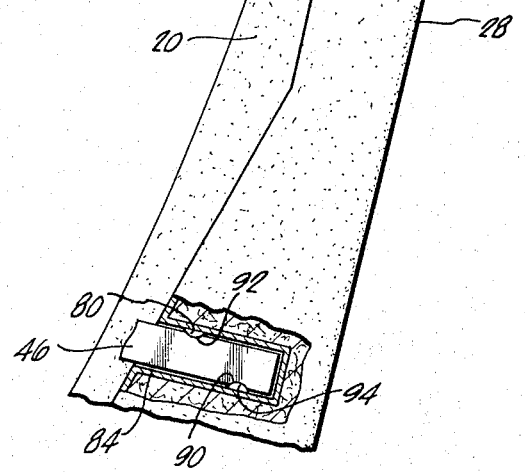
FIGURE 4 is a side elevation, partly in section, of a portion of the frame of the aircraft seat shown in FIGURES 1 and 2.
Figure 5:
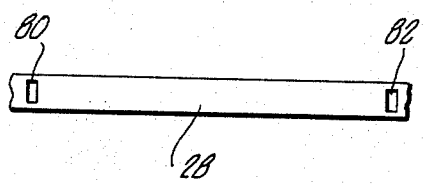
FIGURE 5 is a partial view of the top of the frame assembly shown in FIGURE 4.
Figure 6:
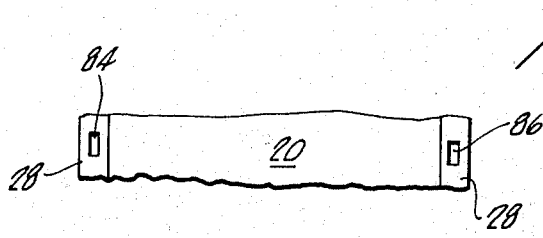
FIGURE 6 is a partial frontal view of the frame assembly shown in FIGURE 4.

FIGURES 4 through 6 show the preferred manner of mounting the headrests and in particular headrest 24 in either its headrest or seat divider position. Frame 28 has a plurality of housings for receiving mounting members 46. Housing 80 is attached to frame 28 and opens at its top, as is seen in FIGURES 4 and 5. A cooperating housing 82 is disposed to receive the second mounting member of headrest 24 on top of frame 28. Housings 84 and 86 are disposed to open in the front of frame 28 and are spaced apart by an amount which is equal to the spacing between housings 80 and 82. Housings 84 and 86 receive mounting members 46 of headrest 24 when the latter is converted into an armrest and seat divider. The spacing between each pair of mounting members is preferably shorter than the spacing between the outside of arms 70 and 72 in order to increase lateral passenger space for seats 12 and 16 over that which is available when seat 10 is used as a three-place unit. Thus, the spacing between housings 80 and 82 and between housings 84 and 86 is as short as possible. A further increase in lateral spacing is provided by the converging lateral contour of headrest 24 which results in an increase in the space available at the front of its adjacent seats.

Each of the members 46 is preferably anchored by detents in the housing in which it is received. The locking feature is shown in FIGURE 4 wherein member 46 has an indent 88 on its upper surface and an indent 90 on its lower surface. Detents 92 and 94 are disposed in housing 84 to cooperate with indents 88 and 90 to lock member 46 in place. These detents may be, for example, spring-loaded balls.

When full seating capacity is desired, headrest 24 is mounted, through the receipt of its mounting members 46 in housings 80 and 82, above back 20 of seat 14. Armrests 30 and 32 are extended from the back of seating assembly 10. The resultant configuration is shown in FIGURE 1. For two-place seating, armrests 30 and 32 are folded into the back of seating assembly 10 and mounting members 46 of headrest 24 inserted in housings 84 and 86 resulting in the configuration shown in FIGURE 2. When lounge accommodations are desired, headrests 22, 24 and 26 are removed and stored or headrest 24 used as a seat divider and armrest with the remaining two headrests removed.

This invention has been described with reference to certain preferred embodiments. However, the scope and spirit of the appended claims should not necessarily be limited to this description.

What is claimed is:
1. A convertible, multiple seat assembly for aircraft comprising:
 (a) a frame;
 (b) at least three side-by-side passenger seats on the frame; and
 (c) a headrest for each passenger seat mounted on the frame in position to support a passenger's head, the headrest for each seat which has two adjacent seats being removable and capable of mounting on the frame between the adjacent seats to form an armrest and seat divider.

2. The convertible, multiple seat assembly claimed in claim 1 including an armrest between adjacent seats, each of such armrests being pivotally mounted to the frame such that it may be folded out from between the seats.

3. The convertible, multiple seat assembly claimed in claim 2 wherein the pivotable armrests are mounted to the frame such that they are capable of folding into the back of the seat assembly, each of such armrests having a contour on its bottom side which conforms to the contour of the seat backs when it is folded into the back of the seat assembly.

4. The convertible, multiple seat assembly claimed in claim 1 wherein the back of each removable headrest is of a hard material, each of such headrests being mountable in the frame with its back facing upward when the headrest is used as an armrest and seat divider.

5. The convertible, multiple seat assembly claimed in claim 4 wherein:
 (a) each of the headrests has a pair of spaced-apart mounting members extending from its bottom edge;
 (b) the frame has a first pair of openings for each removable headrest adapted and positioned to receive the mounting members of such headrest with such headrest in position to support a passenger's head; and
 (c) the frame has a second pair of openings for each removable headrest adapted and positioned to receive the mounting members of such headrest when such headrest is converted into an armrest and seat divider.

6. The convertible, multiple seat assembly claimed in claim 5 wherein the frame includes a housing for each of the mounting members corresponding in number to the number of frame openings each housing being mounted in position to cooperate with one of the frame openings for receiving and removably securing one of the mounting members.

7. The convertible, multiple seat assembly claimed in claim 6 wherein at least each housing for the second pair of openings has detent means operable to removably secure the mounting members.

8. The convertible, multiple seat assembly claimed in claim 7 wherein each headrest back has a recess in its hard material in the form of a tray which is usable as such when the headrests become an armrest and seat divider.

9. A convertible, multiple seat assembly for aircraft comprising:
 (a) a frame;
 (b) at least three side-by-side passenger seats on the frame, each seat having a bottom and back;
 (c) a headrest for each passenger seat removably mounted on the frame in position to support a passenger's head, the headrest for each seat which has two adjacent seats being capable of conversion into an armrest and seat divider by being mounted to the frame over the bottom of such seat between its adjacent seats.

10. A convertible, multiple seat assembly claimed in claim 9 wherein at least the headrest for each seat which has two adjacent seats has a back formed of hard material with a tray formed in such back, each of such headrests being capable of mounting on the frame with the back facing upward from the seat bottom over which the headrest is capable of being mounted as an armrest and seat divider.

11. The convertible, multiple seat assembly claimed in claim 10 including
an armrest between adjacent seats, each of such armrests being pivotally mounted to the frame such that it is capable of folding between the backs of its adjacent seats and having a contour on its bottom side which conforms to the contour of such seat backs proximate the arm in its folded position.

12. The convertible, multiple seat assembly claimed in claim 11 wherein
each headrest has a pair of spaced-apart mounting members extending from its bottom side; and
the frame has a pair of mounting member housings for each seat having two adjacent seats disposed to receive the mounting members such that their associated headrest is positioned above such seat with the hard back at least approximately horizontal.

References Cited

UNITED STATES PATENTS

| | | | |
|---|---|---|---|
| 318,368 | 5/1885 | Gitt | 297—408 |
| 2,584,481 | 2/1952 | Mast et al. | 297—115 |
| 2,661,227 | 12/1953 | Murphy | 297—417 X |
| 3,154,344 | 10/1964 | Stableford | 297—417 X |

CASMIR A. NUNBERG, *Primary Examiner.*